June 13, 1967 D. J. VALLEY ETAL 3,325,628
VAPOR GENERATOR
Filed Feb. 16, 1966

INVENTORS
DAVID J. VALLEY
FREDERICK R. TITTMANN
FRANK E. CARIOU
BY Leo A. Plum, Jr.
ATTORNEY

United States Patent Office 3,325,628
Patented June 13, 1967

3,325,628
VAPOR GENERATOR
David J. Valley, Greenville, S.C., Frederick R. Tittmann, Plainfield, N.J., and Frank E. Cariou, Rochester, N.Y., assignors to Union Carbide Corporation, a corporation of New York
Filed Feb. 16, 1966, Ser. No. 527,919
9 Claims. (Cl. 219—271)

This application is a continuation-in-part of application Ser. No. 358,738, filed Apr. 10, 1964, now abandoned.

This invention relates to a generator for producing vapors from vaporizable material. More particularly, it relates to an improved apparatus for producing a highly directional organic vapor stream.

Films of organic polymers are known in the prior art as insulators and dielectric materials for capacitors. Such films have been produced, for example, by vaporization and subsequent condensation and polymerization on a cooled substrate. Materials such as styrene, benzene, polyethylene terephthalate, ethylene, vinyl chloride, methyl methacrylate, divinyl benzene and the like have been suggested as starting materials for the formation of such insulation and dielectric films. These materials all form films which have some disadvantages, consequently they have not found commercial acceptance, particularly in the production of thin pinhole-free films, in the range of about 0.01 to 1.0 micron in thickness.

It has been found that poly(p-xylylene) will form thin pinhole-free films of high insulating and dielectric characteristics. This material is superior in all respects to any of the prior art materials. Thin films of poly(p-xylylene) are insoluble at room temperature in most common organic solvents, are tough, moisture-resistant and impermeable to most gases. Such films possess a stable temperature coefficient of capacitance which is independent of temperature, and yet they remain tough and flexible at extremely low temperature. Films of poly(p-xylylene) are prepared by pyrolyzing a solid p-xylylene dimer to form vapors of p-xylylene diradicals. Preferably, the solid dimer is heated first to form a dimer vapor and the dimer vapor is then heated further to form vapors of p-xyiylene diradicals. These p-xylylene diradicals are stable in the vapor state, but will condense to form a thin void-free film of solid poly(p-xylylene) upon contact with a cool substrate. The actual temperatures required for vaporization of the dimer, formation of the diradical vapors and condensation of the vapors to a thin polymeric film will depend upon the particular structure or type of p-xylylene used. An unsubstituted p-xylylene having a diradical formula

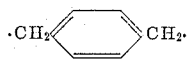

can be obtained by heating an unsubstituted p-xylylene dimer to a sublimation temperature above about 150° C. and then heating the resulting vapors to a cleavage temperature of about 500–700° C. and preferably about 600° C. The resulting unsubstituted diradicals will be condensed and form a thin polymeric film upon contacting a substrate cooled to a temperature of from about −40° C. to about 50° C. If the p-xylylene contains substituents, such as halogens and alkyl groups, the sublimation temperature, the optimum cleavage temperature and the optimum condensation temperature will vary accordingly. Formation of the thin polymeric films generally takes place at a reduced pressure of about 0.01 micron to about 10 mm. Hg. Inert gaseous diluents such as nitrogen, argon, carbon dioxide, helium and the like can be employed to vary the optimum temperature of operation or to change the total effective pressure in the deposition system.

Since the p-xylylene diradicals will condense and form polymers on any surface that is below the condensation temperature of the particular p-xylylene diradical composition, it is highly desirable in order that maximum deposition efficiency be obtained that one be able to direct the diradical vapors at the substrate or target area intended to be coated. This is particularly important when substrates of relatively small surface area are to be coated through masking devices. Such small area substrates are encountered in planar capacitors and resistors intended for use in miniaturized electronic circuits. It is known that certain polymers per se or polymer forming intermediates can be pyrolyzed at low pressure to form a polymeric film on a substrate. There has been a need, however, for suitable apparatus for efficiently directing an organic vapor stream so as to controllably deposit uniform thin polymeric films from such vapors.

The present invention relates to an improved apparatus for generating a highly directional vapor stream, especially of p-xylylene diradical vapors, which will enable thin pinhole-free polymer films to be obtained with high deposition efficiencies on desired substrates. The generator comprises a container open at one end, having heating means associated therewith, the open end of the container communicates by means of a vapor-tight seal through an orifice with an elongated cylindrical tube, having disposed therein a plurality of staggered baffles which together with the interior walls of the tube form a randomly directional passageway through said tube. The tube can be surrounded for at least a portion of its length by a heating means which in turn can be surrounded by a radiation heat shield. The outlet end of the vapor tube communicates with a discharge means which can comprise a manifold having a plurality of equally spaced parallel elongated discharge tubes.

Figure 1:
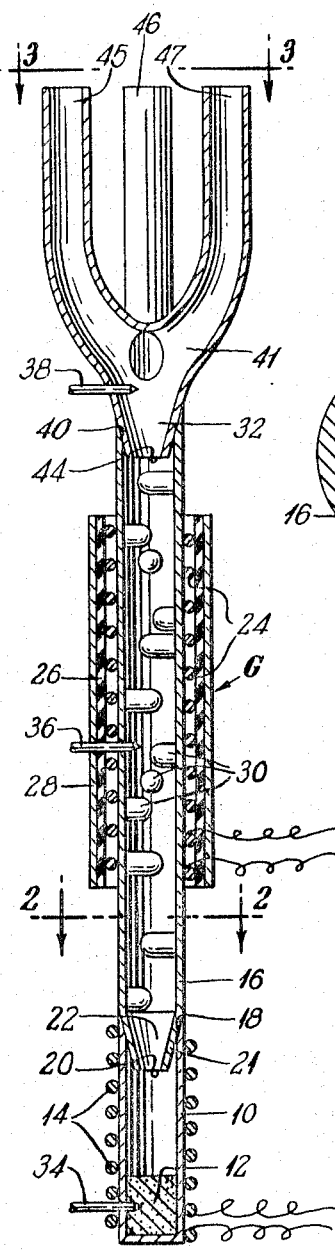
FIGURE 1 shows a cross-sectional front view of an improved vapor generator of the present invention.

In FIGURE 1, the vapor generator G comprises a container 10 which is used to contain the organic material 12 to be vaporized, such as p-xylylene dimer. A heater 14, conveniently an electrical resistance heater, is shown surrounding the container or crucible 10. Other types and arrangements of heaters can be used. The heater temperature is controlled from a power supply (not shown) to produce the desired sublimation conditions. An elongated vapor tube 16 communicates with the crucible 10 preferably through a leak-tight taper joint 18. In order to obtain maximum use of the organic material charged to the crucible and in order to prevent any unpyrolyzed dimer from contaminating the subsequently formed polymer film, all of the organic vapors must pass through the vapor tube. An orifice 20 is shown in this embodiment positioned in an orifice support means 21 between the inlet end 22 of the vapor tube 16 and the crucible 10. This orifice, which may be integral with the inlet end of vapor tube 16, acts as a flow constricting means for the passage of vapors from the crucible 10 into the vapor tube 16. The use of such a flow constricting orifice is preferred since this enables better control to be obtained over the vapor generation. The initial vapors of organic material, such as p-xylylene dimer, are caused by the orifice to remain in the heated crucible zone until they reach optimum temperature before passing into the heating zone of the vapor tube 16. The orifice also tends to smooth out fluctuations in vapor generation in the crucible and thus aids in the formation of a substantially uniform vapor flow which exits from the generator. It is preferred that the orifice 20 have a diameter about .010 inch to .100 inch. The orifice support means 21 is mounted in a leak-tight manner between the crucible 10 and vapor tube 16 so that all the vapors from crucible 10 must pass through orifice 20. The elongated vapor tube 16 is surrounded along at least a portion of its length by a heater 24, conveniently an electrical resistance heater, which is controlled from a power source (not shown) to obtain a desired cleavage temperature in the vapor tube. Other types of heating means can be used. The heater 24 can be surrounded by various means, such as insulation 26 and a radiation shield 28, to minimize heat loss and aid in temperature control in the vapor tube 16.

Figure 2:
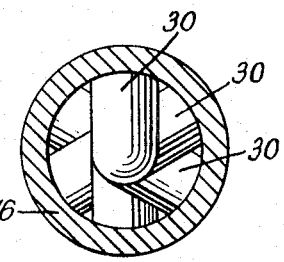
FIGURE 2 shows a view taken along section 2—2 of FIGURE 1.

A plurality of baffles 30 are located along the inner wall of vapor tube 16. These baffles 30 are staggered, as shown in FIGURE 2 for the purpose of providing a random (i.e. other than straight) path for the vapors in order that they may impinge upon and come to thermal equilibrium with the walls of tube 16. Thus, vapors passing through vapor tube 16 are required to take a tortuous non-straight path having multiple collisions with the hot surfaces of the vapor tube 16 and the baffles 30. This provides complete conversion or cleavage of the dimer vapors to the desired diradical vapors. Other structures than those specifically shown here can be used to accomplish this effect. Therefore when it is stated herein that an elongated tube having a plurality of baffles is used, it is also meant to include the use of any arrangement whereby the same effect is accomplished. For example other forms of baffles may be used.

Figure 5:
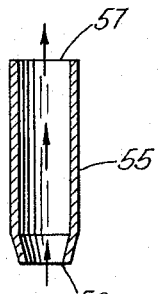
FIGURE 5 shows a cross-sectional front view of a suitable discharge tube for use with the vapor generator of FIGURE 1.

The heated diradical vapors then pass from the elongated tube 16 through orifice 40 and into a vapor discharge means D. The vapor discharge means provides direction to the vapor stream and is used to direct the vapors at a desired cooled substrate upon which the vapors are deposited as a thin polymeric film. In one embodiment of the invention, shown in FIG. 1, the heated diradical vapors emerge from the vapor generator orifice 40 and opening 44 in the vapor discharge means D leading into an exit manifold 41. The opening 44 in the base of manifold 41 is about the same size as the inside diameter of tube 16. Manifold 41 has three equally spaced outlet tubes 45, 46 and 47 whose lengths are about 4–8 times greater than their respective diameters. These outlet tubes serve the dual function of giving direction to and evenly distributing the vapor stream emerging from the generator. Thus, the manifold in effect aims and restricts the vapor stream to the target area to be coated. Instead of the exit manifold and plurality of outlet tubes, it may be sufficient in many cases to use only one discharge tube. In FIG. 5, for example, a single discharge tube 55 is shown. The open end 56 can be designed to fit into the opening 41 in the vapor discharge tube 16. The heated diradical vapors pass through the tube, as shown by the arrows and are discharged out the opening 57 towards the object to be coated.

In some cases it is not desired that the vapors be discharged in a narrow, highly directional stream. It may be necessary to cover a large area of a substrate in which case the tube 55 may be fashioned with a flared opening at 57 or a baffling means may be positioned in opening 57 to distribute the vapors over a large area. The discharge means D shown in FIGS. 1 and 3 may be made with a multiplicity of non-parallel outlet tubes in such a case to spread the vapor stream.

The crucible 10, vapor tube 16, baffles 30 and orifice support means 21 are preferably constructed from a refractory material, such as silica or quartz. The radiation shield is preferably constructed of nickel.

Temperature sensing means, such as thermocouples, can be located in the crucible 10, in the vapor tube 16 and in the discharge means D in order to measure the temperatures at these locations. In FIG. 1 thermocouples 34, 36 and 38 are shown located respectively in the crucible 10, in the vapor tube 16 at a point near the middle of the vapor tube heater 24 and near the outlet end 32 of the vapor tube 16. More than one thermocouple can be used in the vapor tube 16 to give indications of the temperature at several points therein, for example in the middle as at 36 and then above 36 at a point below the outlet opening 40 of the vapor tube.

The outputs of heaters 14 and 24, as well as system pressure and gaseous diluents, if used, can be varied to obtain desired temperatures at these locations and thus more closely control the characteristics of the vapor stream generated by the novel apparatus of the present invention.

Figure 3:
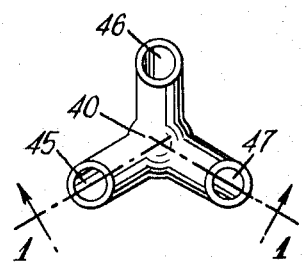
FIGURE 3 shows a top view of FIGURE 1.

FIGURE 3, the header 41 is shown to have three equally spaced outlet tubes 45, 46 and 47, these tubes may have inside diameters ranging from .100 inch to 1.0 inch depending upon the deposition rate desired.

Figure 4:
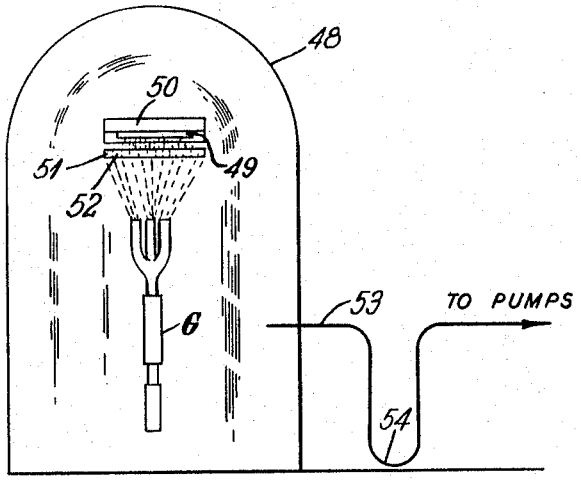
FIGURE 4 shows a partially schematic form of a side view of the coating apparatus employing the vapor generator of the present invention in a vacuum system.

In FIGURE 4, the novel vapor generator G, is positioned inside a coating chamber or bell-jar 48. The substrate 49 to be coated is mounted on a cooled substrate holder 50 and is positioned near the outlet end of the vapor generator G whose exit manifold 41 is pointed at the desired portion of the substrate to be coated. A masking device 51 with suitable spaces therein 52 may be interposed in the path (shown by arrows) of the vapor stream from the generator G to the substrate 49. In some cases it is important to have the vapor stream highly directional so that no stray vapors would go in around the masking device rather than going through it as intended with the result that the entire substrate would become coated. The coating chamber 48 which is connected through a vacuum line 53 to a vacuum pump (not shown) is evacuated to desired deposition pressure. A cold trap 54, such as a liquid nitrogen trap may be positioned in vacuum line 53 to trap any organic vapors and prevent them from contaminating the vacuum pump. The vapor generator G can then be heated to the desired temperature and organic vapors can be directed at and deposited on the target area of substrate 49.

The novel vapor generator of the present invention can be employed not only in a bell-jar as shown in FIGURE 4, but also in other coating chambers where the vapor stream is to be utilized. Such a device is particularly useful in the production of planar resistors and capacitors for miniaturized electronic circuits.

It should be understood that while the novel vapor generator of the present invention is particularly useful for the production of p-xylylene vapors, it can also be used with other vaporizable materials, such as vaporizable organic materials, known in the prior art for the production of thin films on a substrate. It is to be further understood that the apparatus specifically shown and described herein is only one embodiment of the invention. Modifications of this apparatus may be made which will be within the scope of the invention.

What is claimed is:
1. A vapor generator comprising:
 (1) a container open at one end
  (A) having a heating means associated therewith
  (B) the open end of the container communicating with the inlet of
 (2) an elongated tube
  (A) having disposed therein a plurality of staggered baffles which together with the inner walls of the tube form a randomly directional path through said tube for vapors passing into the elongated tube from the container
  (B) said tube having associated therewith a heating means for heating of the elongated tube and contained baffles so as to heat vapors pass- ing therethrough, said heating means having a higher heating capacity than the heating means associated with the container so as to heat material vaporized from the container to a higher temperature in the elongated tube, and said tube having an outlet at its opposite end communicating with the inlet of (C) a vapor discharge means terminating in at least one discharge opening for discharging heated vapors.

2. A vapor generator as in claim 1 in which heating means associated with the container is an electrical resistance heating coil surrounding the container.

3. A vapor generator as in claim 1 in which the heating means associated with the elongated tube are electrical resistance heating coils surrounding the elongated tube for at least a portion of its length.

4. A vapor generator as in claim 1 in which at least one temperature sensing means is located in the elongated tube.

5. A vapor generator as in claim 1 in which at least a portion of the heating means associated with the elongated tube are surrounded for at least a portion of their length by a radiation shield.

6. A vapor generator as in claim 1 in which the inlet end of the elongated tube communicates with the open end of the container through an orifice in the inlet end of the tube which forms a flow constriction means for vapors passing from the container into the elongated tube.

7. A vapor generator as in claim 1 in which the discharge means comprises a manifold terminating in a plurality of equally spaced parallel, elongated discharge tubes whose lengths are several times greater than their respective diameters.

8. A vapor generator as in claim 1 in which the container, elongated tube and baffles are composed of silica.

9. A vapor generator for the production of a stream of organic vapors, comprising:

(1) a container open at one end
  (A) having a heating means associated therewith
  (B) the open end of the container communicating with the inlet of
(2) an elongated silica tube
  (A) having multiple silica baffles protruding along its inner walls, staggered to form together with the inner walls of the tube a randomly directional passageway for vapors passing into the elongated tube from the container
  (B) said elongated tube surrounded for at least a portion of its length by electrical resistance heating coils for heating the elongated tube and contained baffles so as to heat vapors passing through said tube
  (C) at least one temperature sensing means located in said tube
  (D) said elongated tube having an outlet at its opposite end communicating with the inlet of
(3) a vapor discharge means terminating in at least one discharge opening for discharging heated vapors.

References Cited
UNITED STATES PATENTS

| | | | |
|---|---|---|---|
| 515,974 | 3/1894 | Schwoerer | 165—179 X |
| 669,558 | 3/1901 | Stoddard | 122—488 |
| 879,502 | 2/1908 | Van Oosterwyck | 122—488 |
| 2,076,709 | 4/1937 | Deutsch | 219—271 |
| 2,152,157 | 3/1939 | Sittler et al. | 219—275 X |
| 2,793,609 | 5/1957 | Tzu En Shen et al. | |
| 3,152,240 | 10/1964 | Scott | 219—271 |
| 3,161,542 | 12/1964 | Ames et al. | 118—49.1 X |

FOREIGN PATENTS

| | | |
|---|---|---|
| 890,306 | 2/1959 | Great Britain. |

RICHARD M. WOOD, *Primary Examiner.*

C. L. ALBRITTON, *Assistant Examiner.*